May 29, 1956     H. GOLDSCHMIDT     2,747,626
CIRCULAR SAW WORK SUPPORTING TABLE
Original Filed Aug. 18, 1947     2 Sheets-Sheet 1
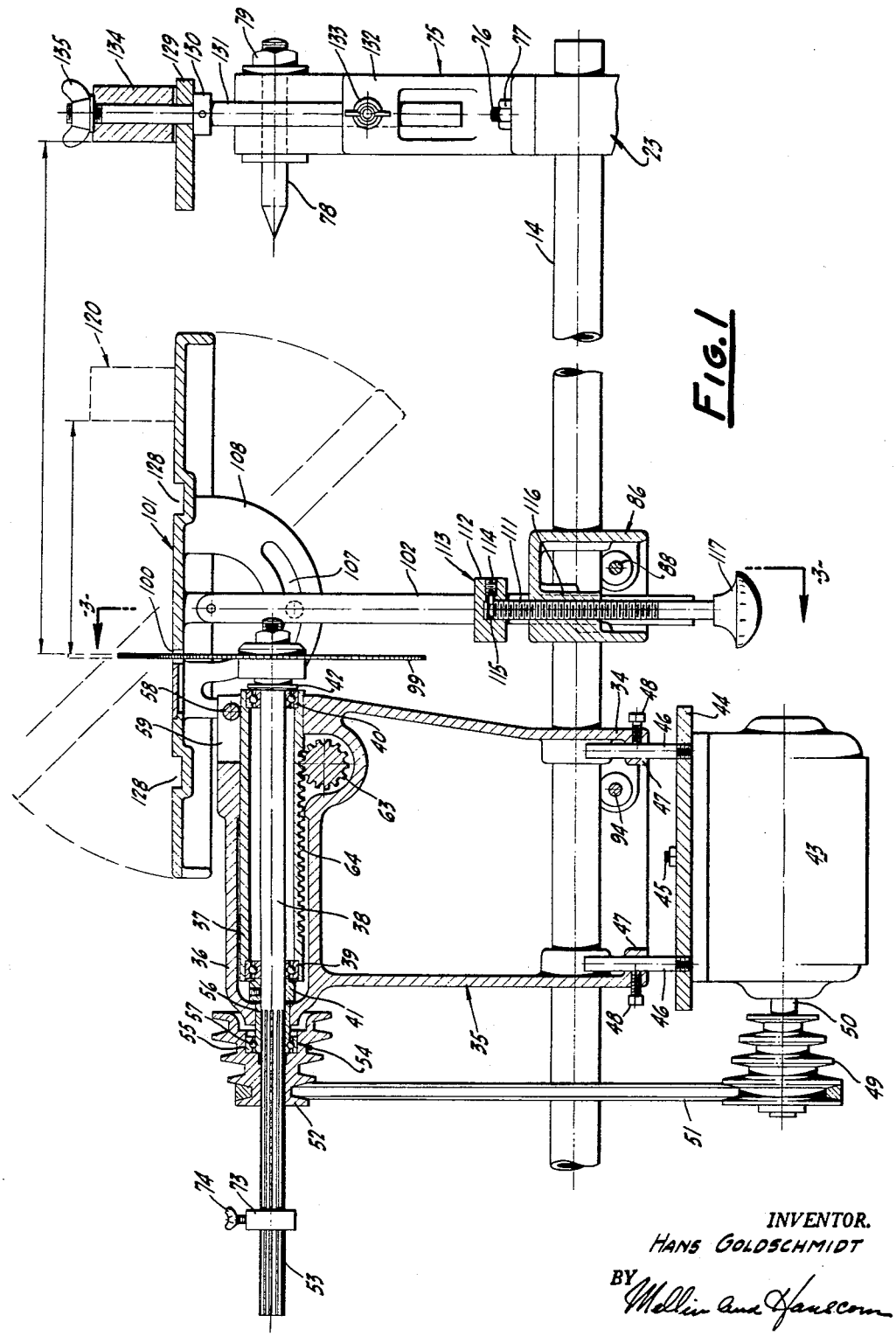
INVENTOR.
HANS GOLDSCHMIDT
BY Mellin and Hanscom
ATTORNEYS

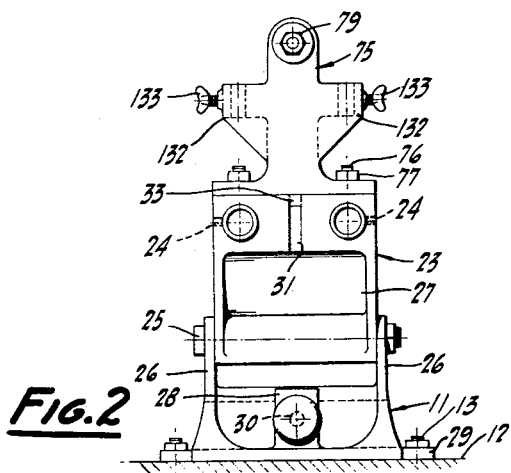
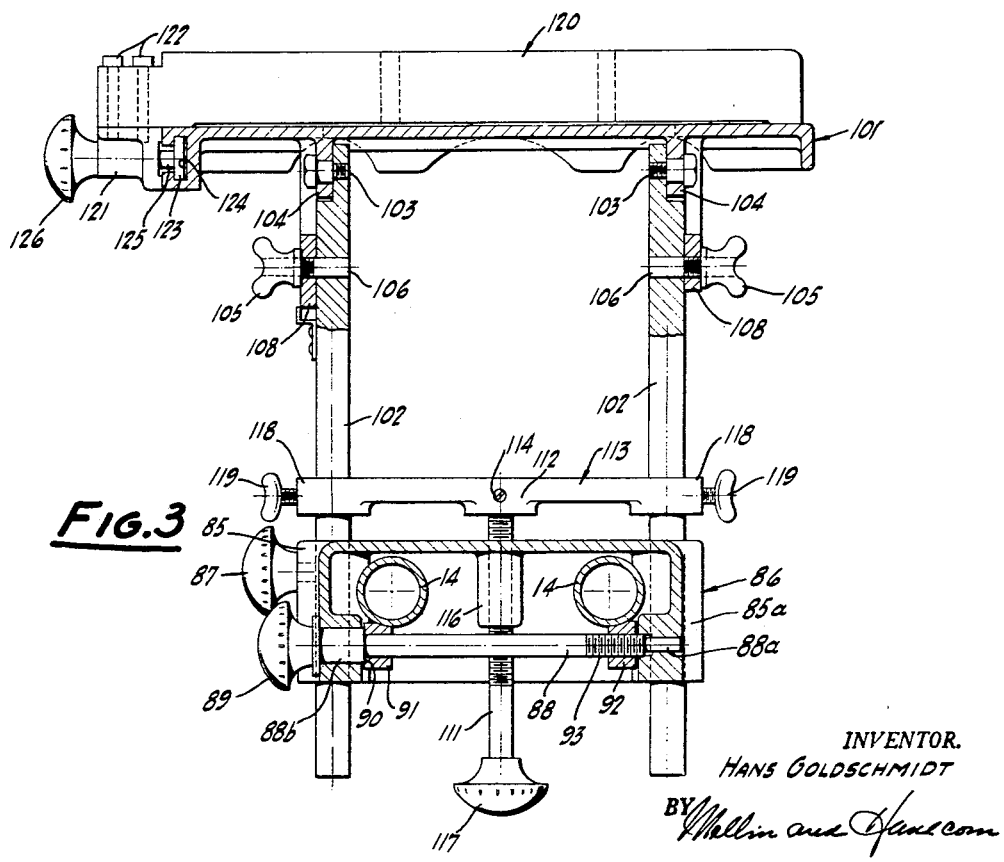

ns patent Office 2,747,626
Patented May 29, 1956

2,747,626

CIRCULAR SAW WORK SUPPORTING TABLE

Hans Goldschmidt, Atherton, Calif., assignor to Magna Engineering Corporation, San Francisco, Calif., a corporation of California Original application August 18, 1947, Serial No. 769,148. Divided and this application November 5, 1952, Serial No. 318,885

4 Claims. (Cl. 144—1)

This invention relates to a wood sawing apparatus and particularly to the work supporting table thereof. The present application is copending with and forms a division of my application Serial No. 769,148, filed August 18, 1947, and entitled "Convertible Material Working Machine," issued December 30, 1952, as Patent No. 2,623,269.

With the conventional type of work shop rotary saw, either bench or floor model, large pieces of work cannot be conveniently cut because the work table of such an apparatus is much too small to support the entire piece of work and hence the outboard end of the work is in some instances supported by a helper or assistant, or is unsupported, and in the latter situation, the operator must attempt to hold the portion of the work adjacent the saw down against the table while simultaneously pushing the work into and through the saw.

It is a primary object of the present invention to provide a rotary saw overcoming the above disadvantageous operating features, not by merely providing a table large in size, which is a much too expensive solution to justify its utilization, but which invention includes a work table comprising two sections mounted on ways and adjustable relative to one another to readily adapt the same for properly supporting work of different sizes.

Another object of the present invention is to provide an apparatus as above described wherein one section of the work supporting table is disposed adjacent the saw and the other section is somewhat remotely disposed and provided with a fence arranged to guide the edge of the work remote from the saw, to thereby permit trimming, squaring, etc. of large size panels or similar pieces of work.

Yet another object of the present invention is to provide an apparatus as above described in which both sections of the work table are vertically adjustable.

The invention possesses many other advantageous features, some of which with the foregoing will be set forth at length in the following description, where that form of the invention, which has been selected for illustration and the drawings accompanying and forming a part of the specification, is outlined in full. In said drawings, one form of the invention is shown, but it is to be understood that it is not limited to such form since the invention as set forth in the claims may be embodied in a plurality of forms.

Referring to the drawings:

Fig. 1 is a combined partial longitudinal section and front elevation of a machine embodying the concepts of the present invention.

Fig. 2 is an end elevation as seen from the right of Fig. 1.

Fig. 3 is a traverse section taken generally along the line 3—3 of Fig. 1.

The machine disclosed in the drawings includes a head end pedestal (not shown) and a tail end pedestal 11 (see Fig. 2), both of which are suitably secured to a bench or table 12 by bolts 13 or the like. Supported by the pedestals are a pair of longitudinal tubular ways 14, the head end of such ways being directly supported by the head end pedestal, as clearly shown in my above identified application, and the tail ends of such ways are received through a bracket 23, to which they are secured by set screws 24 or the like (see Fig. 2). The lower end of bracket 23 is mounted on a hinge bolt 25 extending between the side uprights 26 of tail end pedestal 11, in order to permit ways 14 and supporting bracket 23 to be swung between horizontal and vertical positions (for purposes outside the scope of the present invention). The ways can be swung from a horizontal position until the outer face 27 of bracket 23 engages a supporting arm 28 (see Fig. 2) extending upwardly from the base 29 of tail end pedestal 11. When face 27 engages arm 28, tubular ways 14 are disposed in a vertical position, being held in the latter location by a lock screw or stud 30 which extends into an outer groove or channel 31 in bracket 23 when the latter has been disposed against said arm. Stud 30 is threaded into arm 28 and has a tapered head (not shown) adapted to engage a companion countersunk or tapered portion 33 in groove 31, to lock bracket 23 with the ways disposed in their vertical position. However, for an understanding of the present invention, it is pointed out that the ways 14 will be maintained in a horizontal position, the swinging movement being provided for a purpose outside of the scope of the present invention and fully described in my above identified copending application.

Now, turning to those parts of the machine more pertinently concerning the present invention, as is apparent from Figs. 1 and 3, ways 14 extend slidably through the base 34 of a headstock 35, having a portion receiving a quill 37, in which a spindle 38 is rotatably mounted. Anti-friction ball bearings 39, 40 are disposed at the ends of quill 37 for transmitting both axial and radial loads between the latter and spindle 38. Rear bearing 39 is maintained in proper position between the quill and the spindle by a collar 41 secured to spindle 38, while forward bearing 40 is maintained in position by a suitable lock nut 42 threaded on the spindle.

Spindle 38 is rotated by an electric motor 43, or other suitable prime mover, secured to a mounting plate or bracket 44 by bolts 45. Upwardly extending studs 46, threaded into bracket 44, project through oppositely disposed lugs 47 formed on headstock base 34, the studs being secured in any desired position of adjustment by the clamping action thereagainst of cap screws 48 threaded into lugs 47.

A stepped driving pulley 49 is secured to the motor shaft 50, transmitting its motion through a belt 51 to a driven stepped pulley 52 slidably keyed to the rear splined portion 53 of headstock spindle 38. This stepped pulley 52 is prevented from moving axially by means of an end and radial thrust type bearing 54, whose outer race 55 is secured within pulley 62 and whose inner race is constituted by a sleeve 56 secured to the rear of headstock housing 36, there being suitable balls 57 between the races for transmitting end thrust therebetween with a minimum of friction. By shifting motor mounting studs 46 within lugs 47, belt 51 can be tightened to the desired extent.

Headstock spindle 38 and its supporting quill 37 are movable longitudinally and parallel to ways 14 within housing 36, and may be clamped in any desired position by a lock bolt 58 (see Fig. 1) extending through forward split housing portions 59. The lock bolt construction is fully shown in my previously identified copending application and has various parts associated therewith so that upon proper rotation of said lock bolt, the split housing portions 59 are drawn together to clampingly engage quill 37.

Upon loosening lock bolt 58, the quill and spindle may be moved longitudinally in either direction within housing 36 through rotation of a pinion 63 engaging a rack 64 formed on the underside of quill 37. Pinion 63 is adapted to be operated by a lever (not shown) to advance or retract the quill and spindle.

Movement of the quill and spindle toward the tail end of the machine may be limited by a stop collar 73 adjustably secured on headstock spindle 38 by a lock screw 74 and adapted to bear against the end of driven pulley 52.

The work supporting table of the present invention, which will be fully described hereinafter, comprises two parts or sections, a main section and an auxiliary section. The auxiliary work table section is supported from ways 14 by a table section supporting member 75, functioning as a tailstock when the machine is arranged for use as a lathe as fully shown in my copending application. For convenience in referring to my copending application, the term tailstock for member 75 will be adhered to in the present application, although in the present application the function of such member is to support the auxiliary work table section. Tailstock 75 is secured to bracket 23 by studs 76 and cooperable nuts 77. A spindle 78 (forming no part of the present invention) extends through the upper portion of the tailstock and is secured thereto by a nut 79 mounted on the outer threaded end of the spindle.

Mounted on ways 14 is a carriage 86, said carriage supporting the main work table section, the construction of which will be presently described. As clearly shown in Fig. 3, ways 14 extend slidably through carriage 86 to permit the latter to be moved longitudinally therealong. The carriage may be clamped in various longitudinal positions along the ways by a clamping device including a lock shaft 88 extending under and transversely of ways 14, one end 88a of the shaft being rotatably piloted within one side of the carriage and its other end 88b secured to a knob or handle 89 rotatable in the other side of the carriage. A shoulder 90 on the knob is adapted to engage the outer surface of a lock block 91 engageable with one way 14, there being another lock block 92 internally threaded to engage companion external threads 93 on lock shaft 88 and adapted to bear against the other way 14. By turning lock shaft 88 in one direction, as righthand, it becomes apparent that lock blocks 91, 92 are urged toward each other and against ways 14, thus clamping carriage 86 in the desired longitudinal position of adjustment along said ways.

Relative movement between headstock 35 and tailstock 75 is provided by having the headstock longitudinally movable along ways 14, carrying motor 43 and belt and pulley driving mechanisms 49, 51, 52 with it as a unit. It is here pointed out that headstock 35 actually performs the function of supporting the rotary saw and the terminology headstock has merely been adhered to for continuity of terminology between the present application and applicant's copending application previously identified.

A mechanism is provided for securing or locking the headstock at any desired position of adjustment along ways 14, the mechanism being similar to that just described in connection with the releasable locking of carriage 86 to the ways. This mechanism includes a transversely extending lock shaft 94 (see Fig. 1), rotatably mounted in headstock base 34 and adapted (in cooperation with other parts not shown) when rotated to clamp the headstock to the ways or release the same depending on the direction of rotation of shaft 94.

Secured to headstock spindle 38 is a circular saw blade 99 which extends through a slot 100 in a main table section 101, said main table section forming one part of the overall work supporting table of the machine. A pair of vertical rods or standards 102 extend through carriage bosses 85, 85a (see Fig. 3), such rods having shoulder bolts 103 threaded in their upper ends and receiving the lugs or ears 104 of table section 101, in order to permit pivotal movement of the latter on said rods. Table section 101 may be swung to a variety of angular positions and can be held in such angular positions by wing nuts 105 threaded on studs 106 secured to rods 102 and extending through arcuate slots 107 on guide sectors or arcuate brackets 108 depending from table section 101. Tightening of nuts 105 obviously clamps brackets 108 to rods 102 and prevents their relative movement, whereas loosening of wing nuts 105 permits pivoting movement of the table section about the common axis of shoulder bolts 103 to the desired angular extent.

In addition to being angularly adjustable with respect to the spindle, table section 101 is also vertically adjustable with respect thereto to enable the amount of protrusion of the saw blade through table section 101 to be varied and to enable the table section to be moved upwardly to separate the table section and blade to permit the table section to be moved laterally of the blade during assembly or disassembly of the parts. The upper end of an elevating screw 111 extends within the central boss 112 of an elevating platen 113, being swivelly or rotatably mounted therein through a set screw 114 threaded into the boss and received within a groove 115 at the upper end of the screw. Screw 111 has a threaded shank portion cooperating with an internally threaded central boss 116 on carriage 86, and also a suitable knob or handle 117 at its lower end to facilitate rotation of screw 111 and movement of elevating platen 113 upwardly or downwardly, as the case may be.

The platen has outer bosses 118 (see Fig. 3) through which vertical rods 102 extend, the latter members being releasably secured to the platen by lock screws 119 extending through bosses 118 and adapted to bear against the rods. Upon loosening of a lock screw 87, which bears against one of rods 102, elevating screw 111 may be turned to move table section 101 upwardly or downwardly with respect to spindle 38 and the axis of circular saw blade 99. If rapid table movement is desired, both lock screw 87 and wing screws 119, extending through the platen bosses 118, may be loosened, allowing bodily movement of table section 101 and rods 102 upwardly relative to ways 114 and the circular saw blade. Obviously, the tightening of the various lock screws 87, 119 secures rods 102 and table section 101 in adjusted position.

Table section 101 may be provided with a rip fence 120 (see Fig. 3) secured to a head 121 by cap screws 122 or the like. A lock block 123 is positioned within a groove 124 in a side face of table section 101, and a threaded shank 125 extends outwardly through head 121 and is threaded into a knob 126 which is adapted to bear against head 121 in effecting its clamping to table section 101, in order to fix the rip fence 120 in the desired position therealong. Also, an angularly adjustable guide bracket device (not shown, but of conventional construction) may be mounted within one of two transverse channels 128 formed in table section 101, to permit the work to be positioned angularly with respect to circular saw blade 99 in a known manner.

As disclosed in Fig. 1, headstock 35 and carriage 86 may be suitably positioned along ways 14 and then locked in such position with respect to the tail end of the mechanism, depending upon the work to be performed. An auxiliary work support table section, previously mentioned, and designated by the reference numeral 129 is provided and secured to tailstock 75, said auxiliary table section resting upon collars 130 secured to guide rods 131 extending through side bosses 132 on the tailstock and adapted to be secured in various vertical positions within the tailstock by lock screws 133 extending through the bosses and engaging rods 131. A fence 134, or the fence 120, may be disposed over rods 131 and secured against table section 129 by wings nuts 135 threaded on the upper ends of said rods.

Appropriate adjustment of headstock 35 and carriage 86 along the ways with respect to tailstock 75 allows fence 134 to be disposed the desired distance from circular saw blade 99 to permit larger size panels or pieces of work to be guided in cutting, than through the use of main table section 101 alone. For instance, when relatively large panels are to be trimmed or squared, etc., the proper distance between saw blade 99 and fence 134 can be attained by shifting headstock 35 and carriage 86 along the ways. The operator may then place the work on the work supporting table sections with one edge against fence 134 and the opposite edge disposed slightly or somewhat beyond saw blade 99. The work can then be readily pushed into the rotating saw blade and properly guided by maintaining the same in engagement with fence 134. Even without the fence, table section 129 serves to support the outer end of a relatively long or large piece of work, thereby eliminating the necessity of the operator attempting to simultaneously hold the work down against the main table section and at the same time push the work through the saw blade.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A tool comprising, a supporting frame having rectilinear guide means thereon, a headstock unit on said guide means having a tool-supporting spindle rotatably mounted thereon on an axis substantially parallel to said guide means, a tool on said spindle, a first table support unit mounted directly on said guide means, a first work supporting table adjustable on said first table support for movement toward and from said guide means, a second table support unit mounted directly on said guide means and a second work supporting table mounted thereon for adjustment toward and from said guide means through generally the same range of movement as said first table, at least two of said units being independently adjustable along said guide means toward and from the third unit and each other whereby workpieces of various lengths may be supported on said tables and operated on at desired positions by said tool.

2. A tool as defined in claim 1 wherein both said tables are selectively adjustable toward and from said guide means throughout a range sufficient to permit positioning said tables either nearer to or farther from said guide means than said spindle axis.

3. A tool as defined in claim 1 wherein said spindle is rotatably mounted in a quill slidably mounted on said headstock for adjustment in the direction of said spindle axis.

4. A tool as defined in claim 1 wherein each of said tables is provided with a normally unobstructed work supporting surface, a guide fence, and means for selectively mounting said guide fence on either of said tables to overlie a portion of its work supporting surface.

References Cited in the file of this patent

UNITED STATES PATENTS

| 175,323 | Baggs | Mar. 28, 1876 |
| 1,336,799 | Vaughan | Apr. 13, 1920 |
| 2,013,778 | Halvorsen et al. | Sept. 10, 1935 |
| 2,089,362 | Haas | Aug. 10, 1937 |
| 2,200,799 | Miller | May 14, 1940 |
| 2,364,396 | Stahler | Dec. 5, 1944 |
| 2,623,269 | Goldschmidt | Dec. 30, 1952 |
| 2,633,221 | Roeder | Mar. 31, 1953 |

FOREIGN PATENTS

| 612,779 | France | Aug. 7, 1926 |
| 675,773 | France | Nov. 8, 1929 |

OTHER REFERENCES

Popular Science, March 1950, pages 164 to 171.